United States Patent Office 3,538,072
Patented Nov. 3, 1970

3,538,072
REACTION PRODUCT OF AROMATIC HYDRO-
CARBONS AND THIONYL CHLORIDE IN THE
PRESENCE OF METAL HALIDE FRIEDEL-
CRAFTS CATALYSTS
Louis De Vries, Richmond, Calif., assignor to Chevron
Research Company, San Francisco, Calif., a corporation of Delaware
No Drawing. Filed Dec. 11, 1967, Ser. No. 689,273
Int. Cl. C07g 17/00; C10m 1/38
U.S. Cl. 260—139
11 Claims

ABSTRACT OF THE DISCLOSURE

Compositions prepared by combining thionyl chloride, aromatic hydrocarbon and a Friedel-Crafts metal halide catalyst for times and at temperatures to provide reaction with the evolution of hydrogen chloride. The products find a variety of uses, particularly, the pentane soluble products finding particular use in lubricating oils as oxidation inhibitors.

BACKGROUND OF THE INVENTION

Field of the invention

There is a continuing search for new, improved oxidation inhibitors which are compatible with hydrocarbons. Oxidation inhibitors find a wide range of use, such as in plastics, e.g., polypropylene, lubricating oils, and with oxygen sensitive chemicals.

Of particular interest are ashless (free of metal) oxidation inhibitors for lubricating oils. With the advent of the ashless detergent, e.g., polyisobutenyl succinimides, interest has been further encouraged to find an ashless oxidation inhibitor to replace the zinc phosphorodithioate salts which find common usage.

Description of the prior art

Since the products of this invention seem to be analogous to polyphenylene sulfides, the prior art discussion is primarily concerned with polyphenylene sulfides. Polyphenylene sulfides have been prepared by a variety of routes, primarily depending on the substitution of halogen bonded to an annular carbon of an aromatic ring with sulfur or a thioether.

U.S. Pat. No. 2,513,188 teaches the reaction of chlorinated aromatic hydrocarbons with sulfur and a metal sulfide to prepare polymeric compositions of relatively high molecular weight. The polymers are substantially insoluble in the usual organic solvents and are used for molding.

U.S. Pat. Nos. 3,285,882 and 3,303,170 teach the use of particular catalysts in the displacement of halogen on an aromatic ring by sulfur. While the product properties are not described, the resinous products are indicated to be similar to the products described in the above patent.

Finally, U.S. Pat. No. 3,274,165 teaches the reactions of metal salts of para-halothiophenols to form polyphenylene thioethers, for the most part of relatively low molecular weight.

SUMMARY OF THE INVENTION

Novel compositions are prepared by a novel process comprising combining thionyl chloride, an aromatic hydrocarbon, and a Friedel-Crafts metal halide catalyst for a time and at a temperature to provide a polymeric chlorinated sulfur-containing product, which provides oxidation inhibition properties, extreme pressure properties in lubricants (oils and greases), as well as other beneficial properties of a heat stable compound containing sulfur and chlorine. Usually, at least about 2 moles of thionyl chloride will be used per mole of the aromatic hydrocarbon and less than half a mole of catalyst per mole of aromatic hydrocarbon.

DESCRIPTION OF THE PREFERRED EMBODIMENTS

Compositions

The novel compositions of this invention will have at least about 60 weight percent carbon and at least about 10 weight percent sulfur. Usually, the percent carbon will be in the range of about 60 to 75 weight percent, preferably from about 64 to 70 weight percent. The range of sulfur will ordinarily be in the range of about 10 to 17 weight percent, preferably from about 11 to 15 weight percent. Chlorine will be generally present in from about 0 to 35 weight percent, more usually from about 5 to 20 weight percent.

The molecular weight of the composition will be at least 250 and more usually at least 300, generally not exceeding 5,000. The preferred compositions have molecular weights in the range of about 350 to 900.

Preferred compositions are those that have at least 30 number percent of the carbon atoms as saturated carbon atoms, more preferred 40 number percent of the carbon atoms as saturated carbon atoms. That is, the aromatic hydrocarbon, when benzene, will have one or more saturated substituents having a total of at least 3 carbon atoms, e.g., tert.-butylbenzene, diethylbenzene, etc.

Process

*Reactants.*—As already indicated, there are 3 primary materials concerned with the reaction: an aromatic hydrocarbon, a metal halide Friedel-Crafts catalyst, and thionyl chloride. Variations in the first 2 reactants need only be considered.

The aromatic hydrocarbon will generally be of from 6 to 30 carbon atoms, more usually of from 6 to 20 carbon atoms, and preferably of from 8 to 20 carbon atoms. There may be from 1 to 2 rings, either fused or nonfused, preferably 1 ring (monocyclic).

The saturated substituents on the aromatic ring may be aliphatic or alicyclic, branched or straight chain. There may be from 1 to 3 substituents on the aromatic ring, more usually from 1 to 2 substituents. The hydrocarbon substituent or sum total of the carbon atoms when there is more than one substituent will generaly vary from 1 to 24 carbon atoms, more usually from 1 to 20 carbon atoms. When desirable, mixtures of aromatic compounds may be used having the desired composition.

Illustrative aromatic hydrocarbons include benzene, toluene, xylene, cumene, cymene, tert.-butylbenzene, decylbenzene, tetradecylbenzene, eicosylbenzene, pentaeicosylbenzene, diethylbenzene, dibutylbenzene, indane, Tetralin, cyclohexylbenzene, biphenyl, naphthalene, tert.-butylnaphthalene, bitolyl, etc.

The Friedel-Crafts metal halide catalysts are the metal halides of metals of Groups 2 to 8 of the Periodic Chart having halogen of atomic No. 17 to 35, i.e., chlorine and bromine. Of particular interest are the metal salts of such metals as aluminum, iron, zinc, tin and titanium.

Illustrative catalysts are aluminum chloride, aluminum bromide, ferric chloride, ferric bromide, stannic chloride, titanium tetrachloride, etc. The preferred catalysts are aluminum chloride and aluminum bromide, particularly aluminum chloride.

A discussion of Friedel-Crafts catalysts is found in George A. Olah, "Friedel-Crafts and Related Reactions," New York, Interscience Publication 1963.

*Solvents.*—Various inert diluents may be used which find use in the ordinary Friedel-Crafts reactions. These diluents include nitromethane, nitrobenzene, chloroform, dichlorobenzene, carbon disulphide, etc.

Reaction conditions

The mole ratio of hydrocarbon to thionyl chloride will generally be about 1 mole of the hydrocarbon to from 0.9 to 5 moles of the thionyl chloride, more usually from about 1 mole of the hydrocarbon to about 2 to 3 moles of the thionyl chloride. The catalyst will generally be present in from about 0.01 to 0.5 mole per mole of hydrocarbon, more usually from about 0.05 to about 0.2 mole per mole of hydrocarbon.

The time for the reaction will generally vary from about 0.5 hour to as long as 48 hours, more usually from about 1 hour to about 30 hours. The time will be temperature dependent, as well as reactant and concentration dependent.

The temperature will usually range from about room temperature (20° C.) to about 150° C., more usually from about 30° C. to about 125° C. The temperature may vary during the course of the reaction depending on the manner of addition of the reactant, being lower initially while the reactants are being brought together, but being raised subsequently when the addition of one or more of the reactants has been completed.

When used, the amount of diluent may vary widely being anywhere from about 0.1 weight percent of the total composition to about 50 weight percent of the total composition. More usually, relatively small amounts of diluent will be used, merely to aid the transfer materials, e.g., catalyst. Therefore, while gross amounts of diluent may be used, ordinarily the total amount of diluent will be in the range of about 1 to 10 weight percent of the reaction mixture.

Various modes of addition may be used. Initially, the hydrocarbon may be charged and both the catalyst and thionyl chloride added incrementally. Alternatively, the hydrocarbon and catalyst may be charged and the thionyl chloride added incrementally. In some instances, it may be expedient to add the 3 materials simultaneously, either initially or incrementally.

The course of the reaction may be followed by the evolution of hydrogen chloride. Usually, when all the reactants have been combined, the mixture is heated for a sufficient time to insure completion of the reaction.

Once the reaction is completed, the product may be isolated in various ways. The addition of a lower alkanol, e.g., methanol, may be used to remove the metal catalyst and also destroy any thionyl chloride which is still present. The use of a base such as sodium methoxide to destroy any acid which may be present is also helpful. The product precipitated by the methanol is isolated and then may be purified by dissolving in pentane and extracting with acetone. Other means for isolating the pentane soluble product may also be used.

The following examples are offered by way of illustration and not by way of limitation.

EXAMPLE I

Into a reaction flask was introduced 12 g. of calcium cyanamide (67 weight percent). (The calcium cyanamide is considered to provide substantial amounts of iron which reacts with the thionyl chloride to form ferric chloride, a Friedel-Crafts catalyst.), 150 cc. of octylbenezene and 24 g. of thionyl chloride and the mixture heated at reflux for 16 hours. At the end of this time, the mixture was diluted with 3 volumes of acetone, filtered, and the acetone soluble material precipitated with methanol. The solid material was dried in vacuo and had the following analysis (percent): C, 68.34; H, 7.61; Cl, 8.32; S, 14.71. Mol. wt. (Thermo-NAM, a differential diffusion technique)—1555.

EXAMPLE II

Into a reaction flask was introduced 12 g. of aluminum chloride (anhydrous) dissolved in a minimum amount of nitromethane, 130 cc. of toluene and the mixture heated to reflux, then 80 g. of thionyl chloride slowly added. Strong gas evolution was observed during addition. When the gas evolution stopped, the temperature was raised to 110° C. and maintained for an additional two hours. To the mixture was then added 68 g. of thionyl chloride with a further evolution of gas. At the end of the addition, the temperature was maintained for an additional one hour. The product was then precipitated with methanolic HCl and the precipitate extracted with pentane. The insoluble residue was extracted with benzene. The pentane soluble portion was found to have a molecular weight (Thermo-NAM) of 325, while the benzene soluble portion was found to have a mol. wt. (Thermo-NAM) of 430.

EXAMPLE III

Into a reaction flask was introduced 71.6 g. of diethylbenzene and 3.4 g. of aluminum chloride (anhydrous) in 5 cc. of nitromethane and 127 g. of thionyl chloride slowly added at room temperature. The temperature was slowly increased to 35° C. with strong evolution of gas. The temperature was then raised to about 50° C. and maintained for about 16 hours. At the end of this time, the product was precipitated with methanolic HCl, dissolved in hexane, reprecipitated with methanol and then dissolved in pentane. The pentane was then stripped and the residue had the following:

Analysis.—(percent): C, 65.48; H, 6.37; S, 13.83; Cl, 13.73. Mol. wt. (Thermo-NAM)—515.

EXAMPLE IV

Into a reaction flask was introduced 1,000 g. of diethylbenzene and a solution of 47.5 g. of aluminum chloride (anhydrous) in 70 cc. of nitromethane. At room temperature was slowly added over a period of 6 hours, 1,762 g. of thionyl chloride. The mixture was then heated at a temperature of from about 40°–50° C. for 30 hours. At the end of this time, the product was precipitated with methanolic HCl. The precipitate was dissolved in benzene and reprecipitated with methanol, the precipitate then being extracted with pentane. The pentane soluble portion was treated with activated charcoal. The yield was 522 g.

Analysis.—(percent): C, 65.68; H, 6.13; S, 12.02; Cl, 15.71. Mol. wt. (Thermo-NAM)—520.

EXAMPLE V

Into a reaction flask was charged 70 g. of an aromatic fraction having a boiling range of 180–205° C. (aliphatic substituents having a total of from 4 to 6 carbon atoms) and a solution of 3.4 g. of aluminum chloride (anhydrous) in 5 cc. of nitromethane. To the mixture was added slowly 127 g. of thionyl chloride. At the end of 2 hours, the addition was completed and the mixture was heated at 50° C. with stirring. These conditions were maintained for 24 hours, at which time the reaction mixture was allowed to cool and the product precipitated with methanolic HCl. The precipitate was dissolved in benzene, reprecipitated with methanol, the precipitate extracted with hexanes, the hexane solution filtered and treated with Norite A. After removing the solvent, the residue was redissolved in pentane and the pentane soluble portion isolated. Mol. wt. (Thermo-NAM)—538.

EXAMPLE VI

Into a reaction flask was charged 66 g. of n-alkylbenzene (alkyl of from 11 to 14 carbon atoms) and 0.17 g. of aluminum chloride in 5 cc. of nitromethane. To this mixture was added dropwise 64 g. of thionyl chloride while slowly raising the reaction mixture temperature to 60° C. When the evolution of gas slowed, additional increments of 0.17 g. of aluminum chloride in 5 cc. of nitromethane were added until a total of 0.85 g. of aluminum chloride had been added. When no further evolution of gas was observed, the product was precipitated in methanolic HCl, this precipitate dissolved in pentane, repreciated with methanol, and then extracted with acetone. The pentane soluble, acetone, insoluble product was then isolated. Mol. wt. (Thermo-NAM)—535.

EXAMPLE VII

Into a reaction flask was charged 64 g. of thionyl chloride, 21 g. of benzene and 6.3 g. of ferric chloride. The mixture was heated to 50° C. and when the evolution slowed after about 30 minutes, an additional 1 g. of ferric chloride was added. Additional increments of about 1 g. of ferric chloride were then added every 15 minutes until a total of 6 g. had been added. The mixture was then allowed to stir at reflux overnight. To the mixture was then added 4 volumes of methanol and after stirring and allowing to settle, the supernatant liquid was decanted and the residue dissolved in tetrahydrofuran, filtered and precipitated with ether. Solvent was then removed and the product isolated.

*Analysis.*—(percent): C, 43.3; H, 2.75; S, 11.91; Cl, 34.4; O, 1.39. Mol. wt. (Thermo-NAM)—785.

EXAMPLE VIII

Into a reaction vessel was charged 1,000 g. of n-alkylbenzene (alkyl of from 11 to 14 carbon atoms), the mixture heated to 60° C. and 970 g. of thionyl chloride and 7 g. of ferric chloride added with stirring. After 35 minutes when the evolution of hydrogen chloride had slowed, incremental additions of ferric chloride were made over a 20-hour period. A total of 62 g. of ferric chloride was added. Also, during the course of the reaction, at the end of 4 hours, 282.5 g. of thionyl chloride was added and approximately 2 hours later, a further addition of 261 g. of thionyl chloride was made. At the end of 8 hours, the temperature was raised to 90° C. so that for the last 12 hours of the reaction, the temperature was maintained at 90° C. At the end of this time, the product was cooled and precipitated with methanolic HCl. The precipitate was dissolved in pentane and reprecipitated with a methanol solution of sodium methoxide. The precipitate was extracted with acetone, redissolved in pentane, and filtered. The pentane soluble material weighed 1,072 g.

*Analysis.*—(percent): C, 65.36; H, 7.77; S, 12.25. Cl, 14.0; Fe, 0.47. Mol. wt. (Thermo-Nam)—962.

In order to prepare the material to be used in a lubricating oil, a 607 g. aliquot was washed twice with the sodium salt of ethylene dinitrolotetracetic acid to remove the iron salt which was present.

EXAMPLE IX

Into a reaction vessel was added 1,500 g. of diethylbenzene and 71.2 g. of aluminum chloride in 150 ml. of nitromethane. Over an 8-hour period, 2,556.4 g. of thionyl chloride was added, the temperature rising to 35° C. When the addition of thionyl chloride was completed, the mixture was heated to about 40°–50° C. over a 30-hour period. At the end of this time, the product was cooled and a methanolic hydrochloride solution added, the product was precipitated, the precipitated product was dissolved in benzene and then reprecipitated with methanolic sodium methoxide. The precipitate was redissolved in pentane, treated with Norite A, the charcoal filtered off and the solvent stripped. The residue was redissolved in pentane, cooled to 0° C. overnight and the insoluble portion which formed was removed. The solvent was then stripped again leaving the product.

*Analysis.*—(percent): C, 64.9; H, 6.05; S, 13.54; Cl, 15.26. Mol. wt. (Thermo-Nam)—504.

As already indicated, among the uses which the compositions of this invention have are as additives in lubricants, such as lubricating oils and greases.

The compositions of this invention may be formulated with various lubricating fluids (hereinafter referred to as oils) which either derive from natural or synthetic sources. Oils generally have viscosities of from about 35 to 50,000 Saybolt Universal seconds (SUS) at 100° F. Among natural hydrocarbonaceous oils are paraffin base, naphthenic base, asphaltic base and mixed base oils. Illustrative of synthetic oils are: hydrocarbon oils such as polymers of various olefins, generally of from 2 to 8 carbon atoms, and alkylated aromatic hydrocarbons; and nonhydrocarbon oils, such as polyalkylene oxide, aromatic ethers, carboxylate esters, phosphate esters, and silicon esters. The preferred media are the hydrocarbonaceous media, both natural and synthetic.

The above oils may be used individually or together whenever miscible or made so by the use of mutual solvents.

When used in lubricating oils for internal combustion engines, such as automobile engines and diesel engines, the compositions of the invention will ordinarily be used in combination with ashless detergents. For the most part, these detergents are alkenyl succinimides of alkylene polyamines or other amines. These detergents are described extensively in U.S. Pat. No. 3,219,666. Other detergents include modifications of the succinimide and hydrocarbyl polyamines, analogous to the succinimide, but lacking the succinyl group. See U.S. Pat. No. 3,275,554.

Normally, the zinc salts of dithiophosphate esters are used as oxidation inhibitors. The compositions of this invention avoid the use of metal salts, particularly zinc salts, which are known to form lead paints. At the same time, these novel compositions provide improved oxidation inhibition and superior engine performance under high temperature conditions.

In order to demonstrate the effectiveness of the compositions of the invention under extremely severe engine conditions, exemplary compositions were compounded in a Mid-Continent SAE 30 neutral oil at 5 weight percent, with 5 weight percent of an ashless detergent: bis-polyisobutenyl succinimide of tetraethylene pentamine (polyisobutenyl of approximately 1,000 molecular weight). For comparison, an oil was compounded with the same amount of the same detergent and 12 mm./kg. of a common metal-containing oxidation inhibitor frequently used in conjunction with this detergent, namely, zinc O,O-dialkylphenyl phosphorodithioate (the alkyl groups are of from 12 to 14 carbon atoms). Also, the oil was run with only the detergent and no oxidation inhibitor.

The test used is a particularly severe test which shall be referred to as the 240 BMEP (Brake Mean Effective Pressure) Caterpillar Engine Test. The conditions are for a supercharged caterpillar test when the pressure of the supercharged air is 76.5 in. Hg abs., the water temperature of the cooling jacket is 200° F., the air temperature is 120° F., the oil temperature at the bearing is 190° F., the sulfur content of the fuel is 0.4 weight percent, the speed of the engine is 1200 r.p.m., and the rate of fuel input is at a rate which provdes 6900 B.t.u./min. The test was carried out for 60 hours and the following table indicates the results:

TABLE I

| Additive | Groove [1] deposits | Land [2] deposits | Underhead [3] deposits |
| --- | --- | --- | --- |
|  | 45–7–0–0 | 255–5–10 | 8.0 |
| Zn phosphorodithioate | 70–4–0–0 | 110–0–0 | 7.0 |
| 3 | 85–3–0–0 | 10–1–0 | 7.8 |
| 8 | 72–0.1–0–0 | [4] 20–0–0 | 6.7 |

[1] Grooves—measured on the basis of 0 to 100, 100 being completely filled.
[2] Lands—measured on the basis of 0 to 800, 800 being completely black.
[3] Underhead—measured on the basis of 0 to 10, 10 being completely clean.
[4] Due to a malfunction during the engine run, the conditions were severer than normal.

It is evident from the above results that the composition of this invention provides surprisingly good protection from deposite formation under extremely severe engine conditions.

The compositions of this invention were also tested for extreme pressure properties. Oils were compounded in a 480 neutral oil, the first containing 5 weight percent of polyisobutenyl succinimide ashless detergent as a reference, and the second adding to the reference oil 5 weight percent of the compositon obtained in Example VIII.

The test was carried out by rotating a steel vertical shaft between two screw loaded steel jaws at room temperature, the shaft turning at a speed of 290 r.p.m. Approximately 55 cc. of the candidate oil is used to lubricate the shaft. The load is increased until failure and the highest loaded pass and the loaded failure reported. The following table indicates the results:

TABLE II

| | Pass/fail (lbs.) |
|---|---|
| Ref. oil | 800/770 |
| Ref. oil and 5% Ex. VIII | 2800 |

The above results demonstrate the significant enhancement of extreme pressure properties obtained by employing the compositions of this invention in an oil composition.

As will be evident to those skilled in the art, various modifications on this invention can be made or followed, in the light of the foregoing disclosure and discussion, without departing from the spirit or scope of the disclosure or from the scope of the following claims.

I claim:

1. A composition having a molecular weight of at least 250 prepared by combining thionyl chloride and an aromatic hydrocarbon having from 6 to 30 carbon atoms in the presence of a metal halide Friedel-Crafts catalyst, wherein the mole ratio of aromatic hydrocrabon to thionyl chloride is about 1 to 0.9–5, and the mole ratio of hydrocarbon to catalyst is about 1 to 0.01–0.5, for a time of from 0.5 to 48 hours and at a temperature of from 20 to 150° C. sufficient to provide a product having at least about 10 weight percent sulfur, from about 0 to 35 weight percent chloride, and at least about 60 weight percent carbon.

2. A composition according to claim 1 wherein said Friedel-Crafts catalyst is aluminum chloride.

3. A composition according to claim 1 wherein said catalyst is aluminum chloride and the aromatic hydrocarbon is alkyl benzene, wherein the alkyl group is of from 1 to 24 carbon atoms.

4. A composition according to claim 1 wherein the catalyst is aluminum chloride and the aromatic hydrocarbon is alkyl substituted benzene having 2 alkyl substituents, wherein the sum total of the carbon atoms of the alkyl substituents is in the range of 2 to 24.

5. A composition according to claim 1 wherein the catalyst is ferric chloride.

6. A composition according to claim 1 wherein the time is in the range of 1 to 30 hours and the temperature is in the range of from about 30 to 125° C.

7. A composition according to claim 1 having from 60 to 75 weight percent carbon, from 10 to 17 weight percent sulfur and from 5 to 20 weight percent chlorine, and having a molecular weight of at least 300 and not exceeding 5,000.

8. A composition according to claim 1 wherein said catalyst is aluminum chloride and said composition has a molecular weight in the range of 350 to 900.

9. A composition according to claim 8 wherein at least 30 number percent of the carbon atoms are saturated carbon atoms.

10. A method which comprises combining thionyl chloride and an aromatic hydrocarbon having from 6 to 30 carbon atoms in the presence of a metal halide Friedel-Crafts catalyst, wherein the mole ratio of aromatic hydrocarbon to thionyl chloride is about 1 to 0.9–5, and the mole ratio of hydrocarbon to catalyst is 1 to 0.01–5, for a time of from about 0.5 to 48 hours and at a temperature of from 20 to 150° C. sufficient to provide a product having at least 10 weight percent sulfur and from about 0 to 20 weight percent chloride and having a molecular weight of at least 250.

11. A method according to claim 10, wherein said Friedel-Crafts catalyst is aluminum chloride.

References Cited

Courtot et al. Chem. Abstracts, vol. 40, (1946, p. 3425.5.

Shriner et al. J.A.C.S., vol. 52, (1930), pp. 2060–69.

CHARLES B. PARKER, Primary Examiner

D. R. PHILLIP, Assistant Examiner

U.S. Cl. X.R.

252—48.8; 260—609